UNITED STATES PATENT OFFICE.

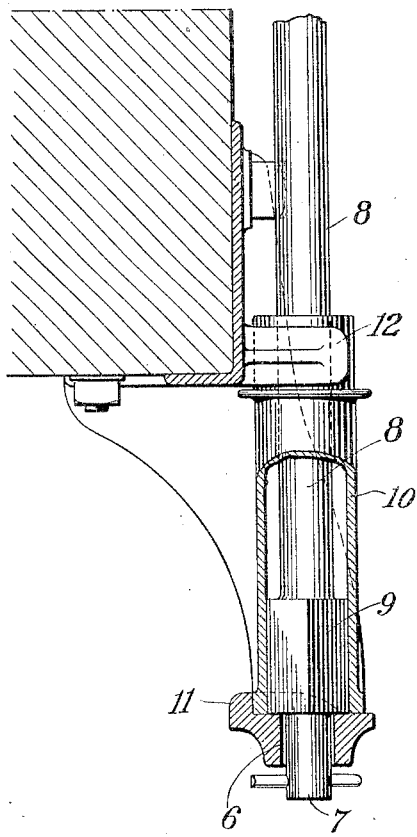
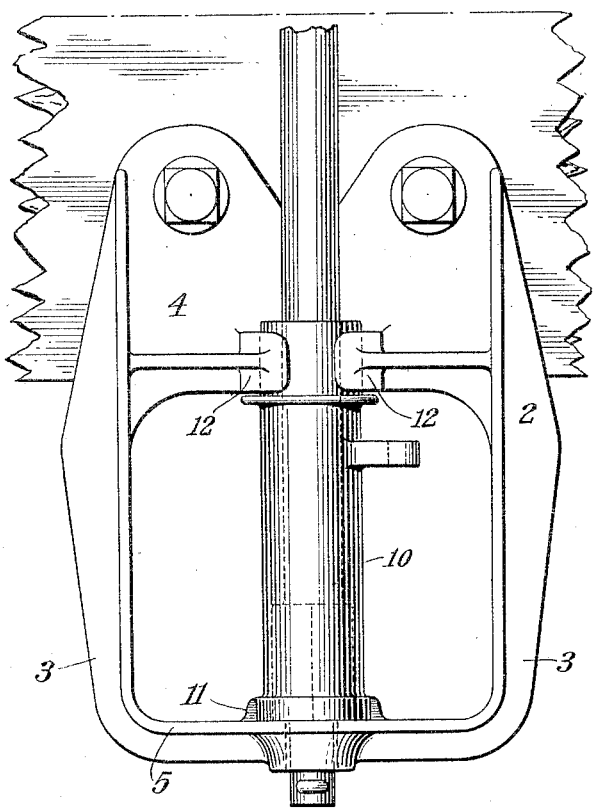
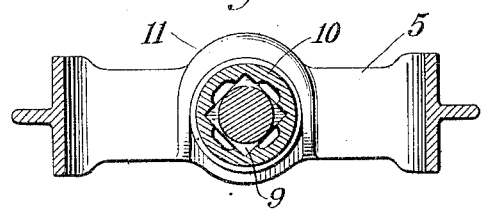

FREDERICK J. TRUMPER, OF CLEVELAND, OHIO, ASSIGNOR TO THE NATIONAL MALLEABLE CASTINGS COMPANY.

HAND BRAKE MECHANISM.

1,098,415.          Specification of Letters Patent.      Patented June 2, 1914.

Application filed December 10, 1912, Serial No. 735,941. Renewed April 15, 1914. Serial No. 832,106.

*To all whom it may concern:*

Be it known that I, FREDERICK J. TRUMPER, a citizen of the United States, residing at Cleveland, Cuyahoga county, Ohio, have invented an Improvement in Hand Brake Mechanisms, of which the following is a specification, reference being had to the accompanying drawings, in which—

Figure 1 is an elevation, partly in section, of my improved device applied to the end sill of a car; Fig. 2 is a front elevation thereof, and Fig. 3 is a plan of the brake shaft step partly in section.

My invention relates to hand operated brake mechanisms and is designed to provide a support and bearing for the lower end of the brake shaft consisting of a sleeve and step which so engage each other as to remove practically all wear and strain from the lower end of the brake shaft, due to the pull of the brake chain and other causes.

Referring to the drawings, 2 is the brake shaft step, preferably made integral and having a U-shaped frame 3 and adapted to be attached to the end sill of a car by the back plate 4. The frame 3 at the center of its base 5 has an aperture 6 for reception of the reduced lower end 7 of the brake shaft 8. The aperture 6 is of slightly greater cross sectional area than the cross section of the lower end 7 of the brake shaft 8, so as to provide clearance between the wall of the aperture 6 and the end 7. The brake shaft 8 has an angular portion 9 which is inclosed in a sleeve 10, the interior of which is so shaped as to fit closely about the portion 9. The sleeve 10 is held in position in the brake shaft step by bendable lugs 12 on the step, which take about the upper portion of said sleeve. At its lower end the sleeve is supported on the base 5 of the step and is partially surrounded by the semi-circular collar 11 preferably formed integral with the said base. The sleeve 10 is adapted to receive and wrap the brake chain and when the parts are under the strain of winding the chain the sleeve 10 fits snugly against the collar 11 which thereby receives all of the lateral strains and wear, since clearance is provided between the walls of the aperture 6 and the end of the brake shaft.

I do not limit myself to the particular form of brake shaft or brake shaft step and sleeve shown herein, since

What I claim is:

1. In a hand brake mechanism, a brake shaft, a brake shaft step, the brake shaft step being apertured for reception of the lower end of the brake shaft and having an abutment on its base, a sleeve secured to the brake shaft and having at its lower end a lateral bearing against the said abutment.

2. In a hand brake mechanism, a brake shaft having an annular lower end and a portion adjacent to the lower end of angular cross section, a brake shaft step having an aperture of greater cross-section than the lower end of the shaft, a sleeve mounted in the step secured to the angular portion of the shaft and having a bearing at its lower end on the step to prevent lateral movement of the brake shaft.

3. In hand brake mechanism, a brake shaft, a brake shaft step, a sleeve inclosed and rotating with the lower end of said brake shaft and being revolubly mounted on said step, a semi-circular collar upon said step adapted to bear against the lower end of said sleeve and to relieve the lower end of the brake shaft from wear and lateral strains in one direction but permitting lateral removal of said sleeve from the step in an opposite direction.

FREDERICK J. TRUMPER.

Witnesses:
HARRY E. ORR,
GERTRUDE R. KELLER.